United States Patent [19]
Mitchell

[11] 3,919,889
[45] Nov. 18, 1975

[54] ROTOR BALANCING APPARATUS

[75] Inventor: Wallace F. Mitchell, Mettawa, Ill.

[73] Assignee: Ammco Tools, Inc., North Chicago, Ill.

[22] Filed: Jan. 22, 1975

[21] Appl. No.: 543,025

[52] U.S. Cl. .................................. 73/485; 73/486
[51] Int. Cl.² .......................................... G01M 1/14
[58] Field of Search ............................. 73/483–486

[56] References Cited
UNITED STATES PATENTS 2,698,537  1/1955  Taylor et al. ......................... 73/486
3,148,546  9/1964  Karig ................................... 73/486

Primary Examiner—James J. Gill
Attorney, Agent, or Firm—Edmond T. Patnaude

[57] ABSTRACT

A hang-type balancer incorporates a rotor centering and support mechanism which is removably attached to a universal pivot assembly supported by hangable support, a spirit level being mounted on said pivot assembly within the hangable support.

7 Claims, 5 Drawing Figures

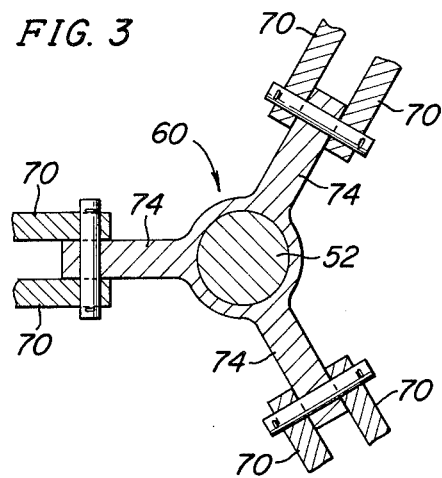
FIG. 3
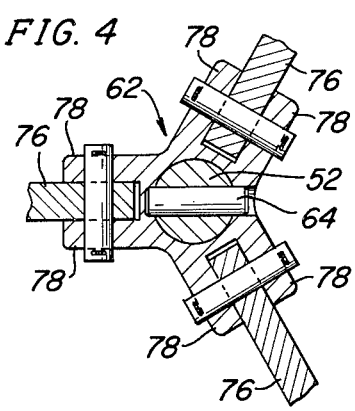
FIG. 4
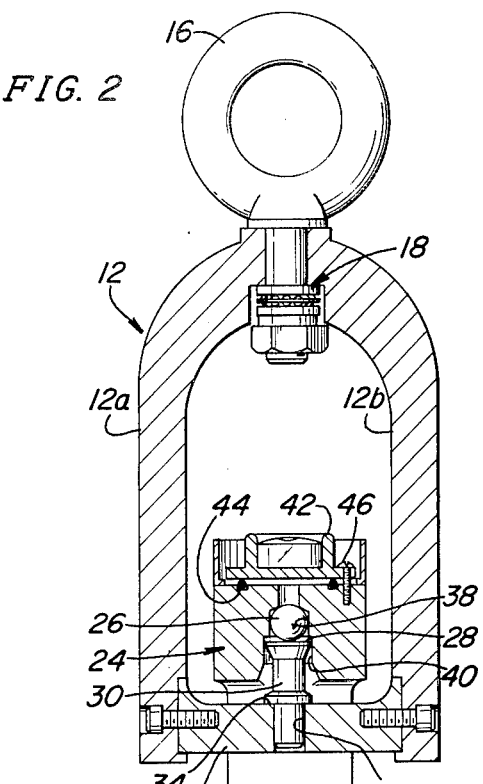
FIG. 2
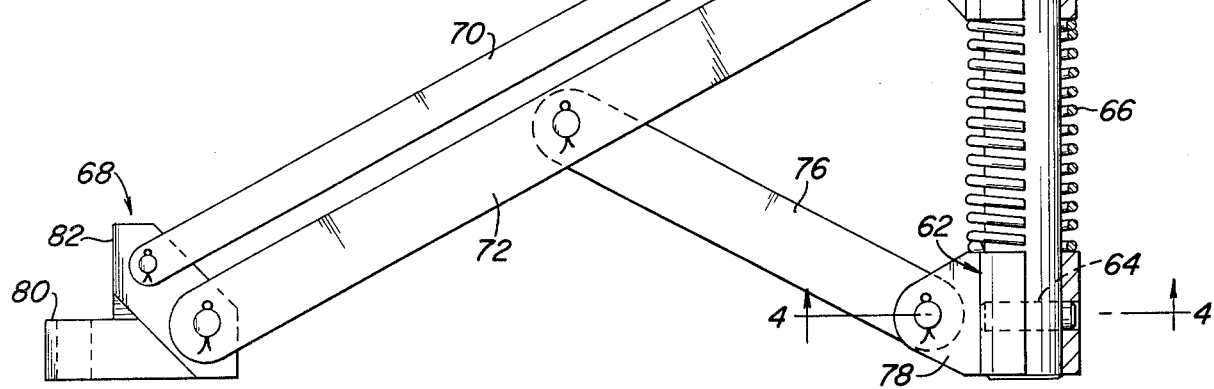

ROTOR BALANCING APPARATUS

SPECIFICATION

The present invention relates in its broader aspects to the art of rotor balancing, and it relates more particularly to a hang-type static wheel balancer which may readily be used for balancing other rotors such, for example, as flywheels.

BACKGROUND OF THE INVENTION

The most commonly used wheel balancer is the bubble balancer having a wheel mounting mechanism pivotally supported on a vertical post extending upwardly from a base. A spirit level mounted on the wheel mount provides a visual indication of the extent to which the principal plane of the wheel differs from the horizontal plane. Because the wheel to be balanced must be lifted onto the balancer, such balancers are not easily used with large, heavy wheels as used on trucks, airplanes and the like. Moreover, the wheel mounting mechanisms used with such balancers do not accommodate all of the many different automotive vehicle wheel designs nor can they be used with multiple wheel sets as commonly used on trucks, or with other commonly used rotors such as flywheels.

OBJECTS OF THE INVENTION

Therefore, an object of the present invention is to provide new and improved rotor balancing apparatus suitable for use with large, heavy wheels and other rotors.

Another object of this invention is to provide a new and improved wheel mount for mounting a wheel to be balanced to a wheel balancer.

A further object of this invention is to provide a new and improved hang-type rotor balancer which is sturdy and durable in construction, is easy to use, and which enables precise and repeatable balance measurements.

SUMMARY OF THE INVENTION

Briefly, the rotor balance measuring apparatus of the present invention comprises a pivot assembly and associated hanger support for supporting the pivot assembly from above, and a rotor mounting mechanism removably connected and disposed below said pivot assembly for support thereby. The mounting mechanism includes radially adjustable chuck jaws positionable in the center hole of a wheel to be balanced for centering and supporting the wheel.

BRIEF DESCRIPTION OF THE DRAWING

Further objects and advantages and a better understanding of the present invention can be had by reference to the following detailed description, wherein:

FIG. 2 is an enlarged, cross-sectional view of the balancer shown in FIG. 1;

FIG. 3 is a sectional view taken along the line 3—3 of FIG. 2;

FIG. 4 is a sectional view taken along the line 4—4 of FIG. 2; and

DETAILED DESCRIPTION OF THE INVENTION

Figure 1:
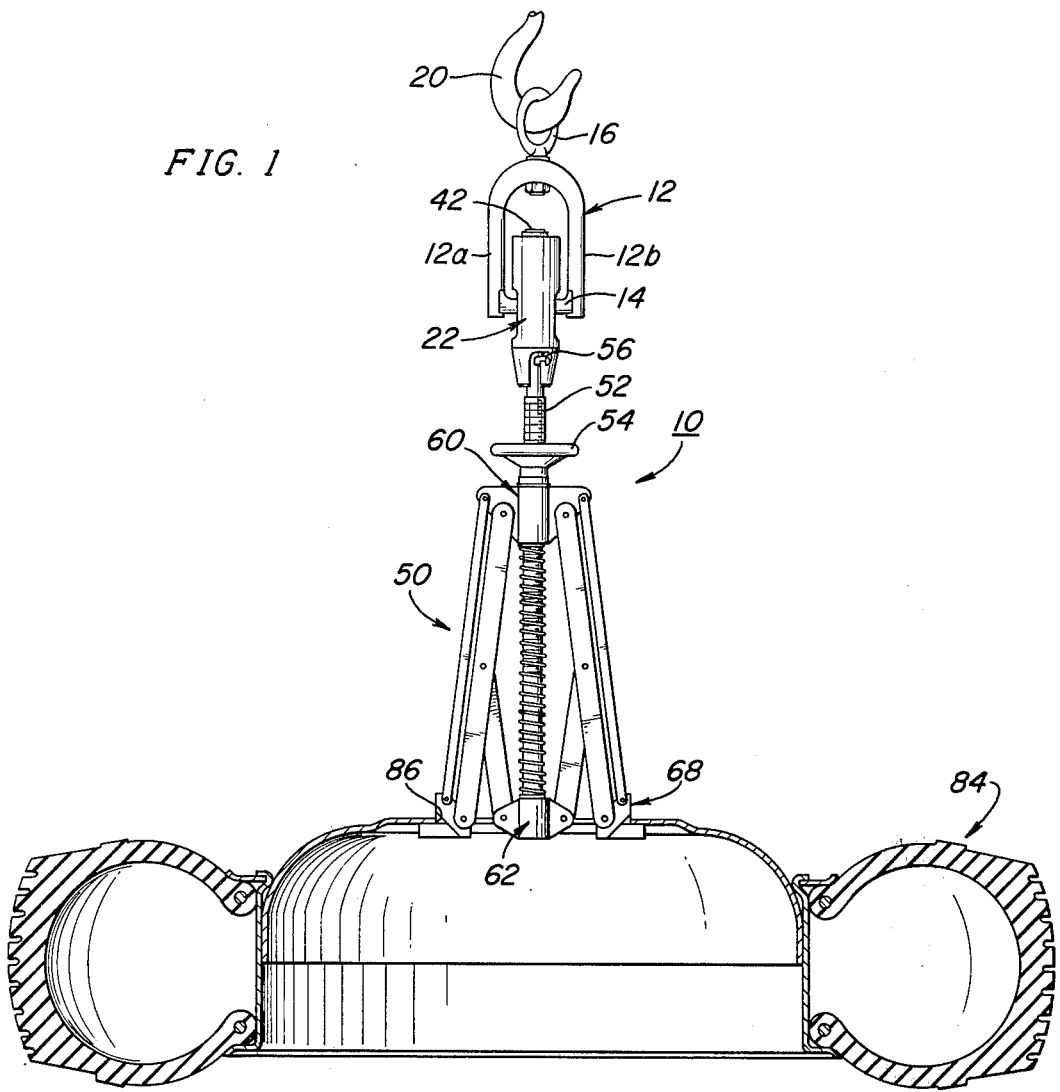
FIG. 1 is an elevational view showing a hang-type rotor balancer embodying the present invention in use.
Figure 5:
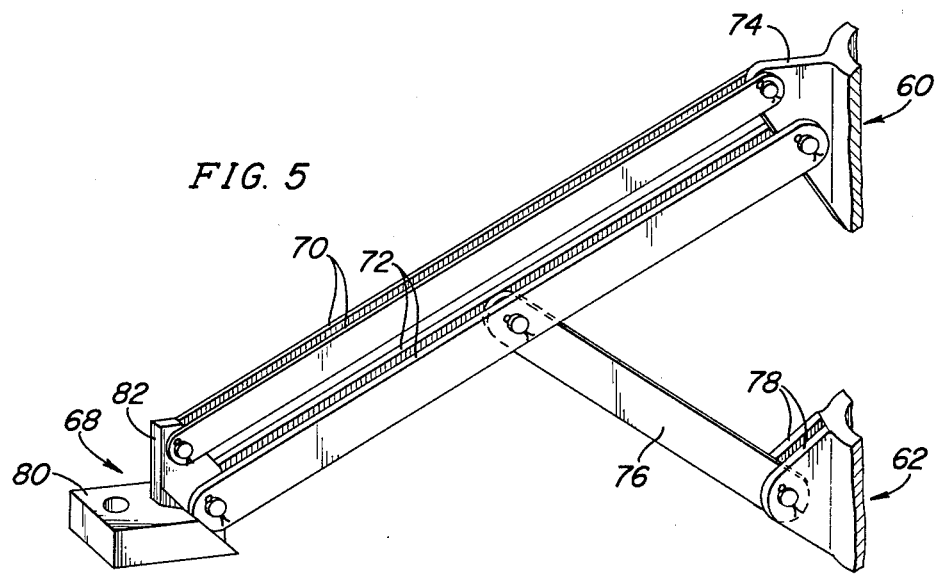
FIG. 5 is a perspective view showing one of the linkages and wheel mounting chuck jaws used in the balancer of FIG. 1.

Referring particularly to FIGS. 1 and 2, a hangtype rotor balancer 10 comprises an inverted U-shaped balancer support 12 having a cross arm 14 fixed at its ends to leg portions 12a and 12b of the support 12. A swivel ring 16 is rotatably attached to the support 12 by means including a ball thrust bearing connection 18 to permit the hanger to swivel while a wheel is suspended therefrom. As shown in FIG. 1, the swivel ring 16 may be placed over a hook 20 for lifting and supporting the balancer 10 in an elevated position.

A balancer head 22 is mounted to the hanger 12 by means of a ball and platen pivot assembly 24 comprising a hard spherical ball 26 and a hard platen disc 28. The ball 26 and disc 28 may be formed of carbide but in order to prevent deformation of the platen surface the disc should be harder than the ball. The platen disc 28 is mounted to the top of an anvil 30 whose lower end is fitted in a central vertical hole 32 in the cross arm 14. A flange 34 on the anvil 30 supports the anvil on top of the cross arm 14. The balancer head 22 has an elongated transverse opening 36 through which the cross arm 14 freely extends to permit the head to freely pivot relative to the platen 28.

The portion of the head 22 above the transverse opening 36 has an axial bore 38 into which the ball 26 is press fitted. Should a flat develop on the portion of the ball which engages the platen, the ball 26 can be pressed out of the bore, rotated a small amount and pressed back into the bore 38 to provide a fresh pivot surface. The bore 38 is counterbored at 40 to loosely receive the platen 28 to permit it to pivot relative to the ball 26 and head 22. A 360° spirit level 42 is mounted to the top of the head over a resilient O-ring 44 by a plurality of screws 46 to adjustably position the level on the head. This permits calibrating the balancer so that the level 42 is precisely perpendicular to the longitudinal axis of the balancer head 22. An upstanding annular flange on the head surrounds the level to protect it from damage. Also, being located within the hanger the level is still further protected.

The lower portion of the head 22 is provided with a central longitudinal bore 48 for receiving the upper end of a chuck assembly 50. The chuck assembly 50 includes a chuck spindle 52 whose upper end fits into the bore 48 and is removably held in place therein by means of a bayonnet joint 54 including a transverse pin 56 on the spindle and an L-shaped slot 58 in the balancer head. The chuck spindle is threaded immediately below the balancer head as indicated at 52a and an adjustable locking wheel 57 is threadedly received thereon.

Slidably mounted on the chuck spindle 52 below the threaded portion 52a is an axially adjustable anchoring sleeve 60, and a second anchoring sleeve 62 is fixed to the bottom end portion of the chuck spindle by a cross pin 64 received in aligned transverse holes in the sleeve 62 and in the chuck spindle. A coil spring 66 is disposed over the spindle and compressed between the anchoring sleeves 60 and 62 to bias the adjustable sleeve 60 upwardly against the wheel 57.

Each of three equi-angularly spaced chuck jaws 68 are connected to the upper anchoring sleeve 60 by means of two pairs of parallel linkage arms 70 and 72 disposed one above the other. The pairs of arms 70 and 72 are each pivotally connected by suitable means near their respective ends to the associated chuck jaw 68 and to an ear 74 on the sleeve 60. A linkage arm 76 is pivotally connected at one end to the arm 72 and pivotally connected at the other end to an ear 78 on the sleeve 62. Each jaw 68 has a horizontal rotor supporting surface 80 and an inwardly adjacent vertical surface 82 for centering the rotor to be balanced relative to the longitudinal axis of the chuck spindle 52. The surfaces 82 are relatively narrow and are equally spaced from the longitudinal axis of the spindle 52.

OPERATION

In order to use the balancer 10 to balance a wheel such as indicated at 84 in FIG. 1, the balancer swivel ring 16 is placed on a vertically movable support hook 20 and the wheel 84 is placed on the floor or ground thereunder. With the hand wheel 57 in an upper position so that the chuck jaws 68 are retracted and fit through the center hole 86 in the wheel rim, the balancer is lowered to position the jaw surfaces 80 within the hole 86 below the underside of the rim portion surrounding the hole. The hand wheel is then turned down so that the surfaces 80 move outwardly and underlie the rim, but the centering surfaces 82 do not all touch the side of the hole 86. The balancer is then raised to lift the wheel 84 from the floor or ground, and the hand wheel 57 is tightened down to move the jaws 68 radially outward to cause the vertical jaw surfaces 82 to center the wheel 84 on the balancer. Any subsequent swinging of the balancer can be quickly stopped by hand or leg pressure on the wheel 84 and the bubble in the level 42 will then show if the wheel is balanced, and if not, in which angular direction it is out of balance. Weights can then be affixed to the wheel rim in the normal manner until the bubble in the level is precisely centered.

Multiple wheels can be simultaneously balanced with the balancer 10 by engaging the upper rim thereof with the chuck 50 and thus hanging both wheels together. Moreover, other rotors which are relatively long in the vertical direction, such as fly wheels, can be readily balanced using this balancer. For some other types of rotors the chuck 50 can be removed from the balancer head and the center shaft of the rotor can be connected directly to the head 22 or connected thereto by means of an adapter.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. Apparatus for statically balancing a rotor relative to the axis of rotation thereof, comprising
a generally U-shaped support having means connected thereto for hanging said support from above,
said support having an opening therein,
first pivot means carried by said support,
second pivot means pivotally supported by said first pivot means and including a balancer head positioned in the opening in said support,
level indicating means disposed at the top of said balancer head,
a rotor attachment removably mounted to said head below said first and second pivot means,
said rotor attachment comprising
an elongated spindle having an externally threaded upper portion,
an adjusting wheel positioned on said spindle in threaded engagement with said threaded upper portion,
a first sleeve slidably disposed on said spindle below said adjusting wheel,
a second sleeve fixedly connected to said spindle near the bottom thereof,
a plurality of equi-angularly spaced rotor centering and support jaws,
a plurality of sets of mutually parallel linkage arms,
the linkage arms in each of said sets being respectively pivoted at one end to said jaws and at the other end to said first sleeve,
a plurality of linkage arms each pivotally connected at one respective end to said second sleeve and at the other end to one of said sets of linkage arms, and
spring means urging said first sleeve upwardly against said adjusting wheel.

2. Apparatus according to claim 1 wherein said jaws each have horizontal and vertical rotor engaging surfaces.

3. Apparatus according to claim 1 wherein said balancer head comprises
a generally cylindrical housing having a transverse opening therethrough,
a cross arm portion of said support extending through said opening,
said first pivot means includes an anvil extending upwardly from said cross arm,
said second pivot means comprises a spherical ball fixed to said housing above said opening,
the center of said ball lying on the central longitudinal axis of said balancer head, and
the central longitudinal axis of said anvil being aligned with the central longitudinal axis of said balancer head.

4. Apparatus according to claim 3 wherein said balancer head is provided with a downwardly opening central bore, and
said spindle extends into said bore and depends from said balancer head.

5. Apparatus according to claim 4 comprising a bayonet joint between said spindle and said balancer head.

6. Apparatus according to claim 1 wherein said balancer head is an integral elongated member.

7. Apparatus according to claim 1 wherein said adjusting wheel is a hand wheel.

* * * * *